United States Patent [19]

Stubbings

[11] 4,170,324

[45] Oct. 9, 1979

[54] BRACKET MOUNT FOR LOCK BOX

[75] Inventor: James H. Stubbings, Rockville, Md.

[73] Assignee: Potomac Applied Mechanics, Inc., Bethesda, Md.

[21] Appl. No.: 807,231

[22] Filed: Jun. 16, 1977

Related U.S. Application Data

[63] Continuation-in-part of Ser. No. 760,955, Jan. 21, 1977, Pat. No. 4,058,993.

[51] Int. Cl.² ............................................. B60R 11/00
[52] U.S. Cl. ...................................... 224/279; 70/58; 70/63; 224/42.45 R; 248/553
[58] Field of Search ............ 224/29 G, 29 H, 42.42 R, 224/42.45 R, 42.46 R; 248/201, 203 R, 205 R, 311.1; 325/312; 70/58, 63

[56] References Cited

U.S. PATENT DOCUMENTS

| | | | |
|---|---|---|---|
| 2,798,369 | 7/1957 | Homan | 248/203 X |
| 3,103,630 | 10/1963 | Pitts et al. | 325/312 |
| 3,347,069 | 10/1967 | Hollingshead, Jr. | 70/63 |
| 3,965,705 | 6/1976 | Nadler | 70/58 |
| 4,024,737 | 5/1977 | McInturff | 70/58 |
| 4,058,993 | 11/1977 | Stubbings | 70/63 |
| 4,065,946 | 3/1978 | Loynes et al. | 70/58 |
| 4,072,031 | 2/1978 | Kent | 70/58 |
| 4,079,604 | 3/1978 | Anderegg | 70/58 |

FOREIGN PATENT DOCUMENTS 660080 10/1951 United Kingdom ............ 224/42.42 R

*Primary Examiner*—Trygve M. Blix
*Assistant Examiner*—Winston H. Douglas
*Attorney, Agent, or Firm*—Cushman, Darby & Cushman

[57] ABSTRACT

A bracket mounting assembly for mounting an object to a stationary plate, in general, and in particular for mounting a CB radio or the like in a motor vehicle. Although the bracket mounting assembly is detachable, and readily installable, by an authorized person, no access is available to the mounting portions thereof from the exterior so that an unauthorized individual attempting to remove the object must either destroy the stationary plate, the object, or the several structural components of the mounting assembly. The assembly includes first and second general U-shaped members, fasteners for fastening the object to both of the first and second members extending from the interior of the object into operative association with each leg of the second member, and second fasteners for fastening the second member to the stationary plate, the cross portion of the first U-shaped member covering the second fasteners when the bracket is assembled. The object to be mounted preferably includes a CB lock box made out of metal and having inaccessible locking means.

14 Claims, 9 Drawing Figures

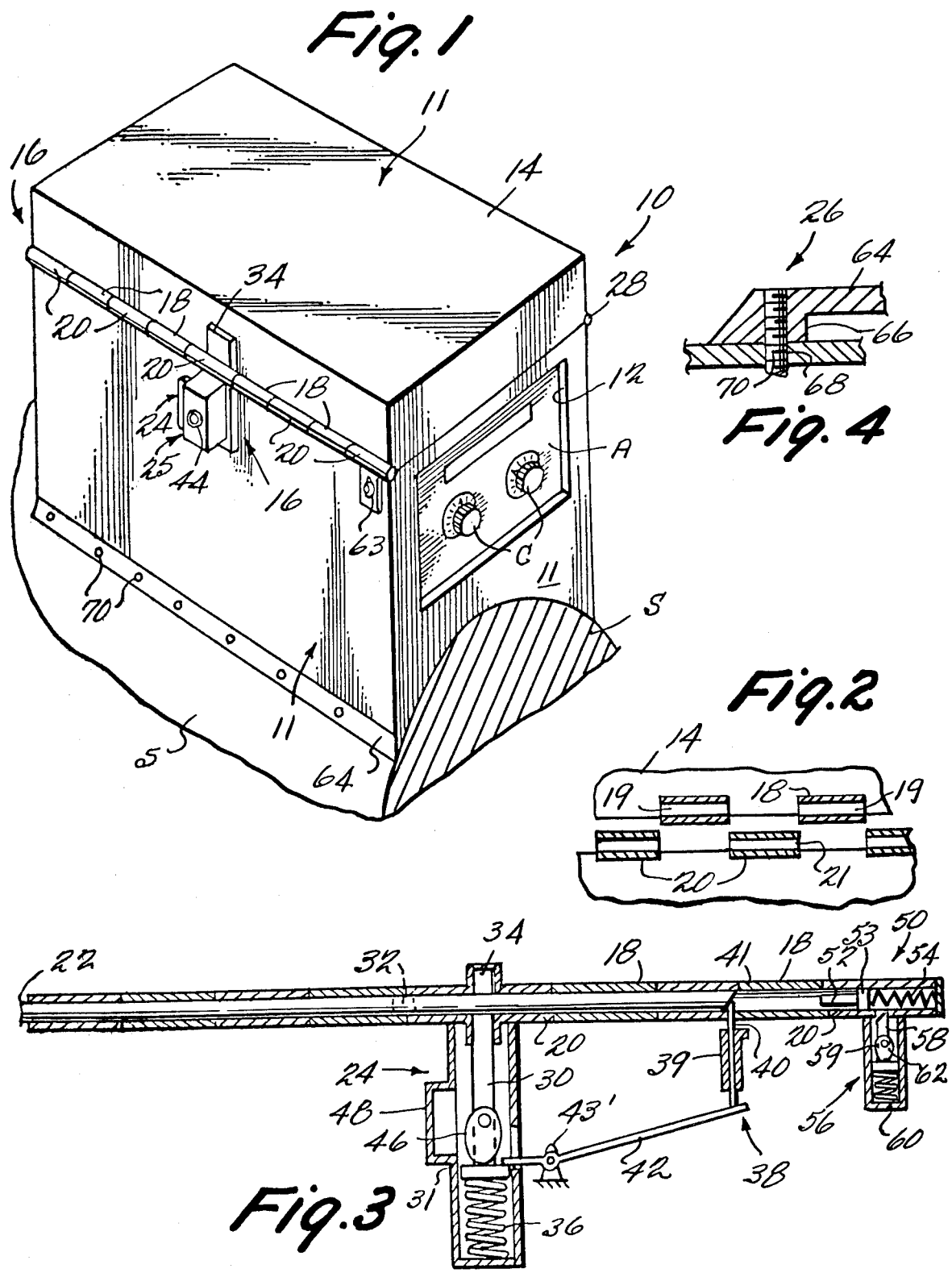

BRACKET MOUNT FOR LOCK BOX

CROSS REFERENCE TO RELATED APPLICATION

This application is a continuation-in-part of Application Ser. No. 760,955, filed Jan. 21, 1977 and entitled "Lock Box", now U.S. Pat. No. 4,058,993.

BACKGROUND AND SUMMARY OF THE INVENTION

The invention relates to an assembly for preventing theft of an object mounted to a stationary plate, in general, and in particular for preventing theft of a CB radio of like appliance mounted in a motor vehicle. The theft of CB radios and the like from motor vehicle is a significant problem—to such an extent that many insurance companies today will not write insurance for CB radios in motor vehicles. Co-pending Application Ser. No. 760,955 discloses a particular lock box for mounting of CB radios or the like in motor vehicles so that the chances of theft thereof are minimized, and the bracket mounting assembly according to the present invention may incorporate the lock box of Ser. No. 760,955, or similar structures, for ready mounting within the interior of a motor vehicle.

According to the present invention, two different types of brackets are provided, one especially adapted for mounting an object to the dash or like structure of a motor vehicle, and the other for ready mounting of an object to the transmission hump or like stationary plate of a motor vehicle. Both brackets are readily installable in a motor vehicle, can provide for adjustment of the angular position of the object with respect to the stationary plate, and can be removed from the vehicle by an authorized person if necessary. However, both brackets are extremely difficult to defeat by an unauthorized person, and no access may be gained to the fasteners for attaching the brackets to the vehicle, so that for an unauthorized individual to remove the object from the vehicle either the stationary plate, object, or multiple portions of the bracket itself must be destroyed.

The bracket mounting assembly according to the present invention, for mounting an object to a stationary plate, comprises first and second generally U-shaped members, the first member having the legs thereof spaced a distance sufficient to receive the object therebetween and the second member having the legs thereof spaced an effective distance sufficient to receive the legs of the first member therebetween. First fastening means are provided for fastening the object to both the first and second members legs, the fastening means comprising at least one removable fastener extending from the exterior of the object through each leg of the first member into operative association with each leg of the second member. Second fastening means are provided for fastening the second member to the stationary plate, the second fastening means comprising at least one fastener extending from between the cross portions of the first and second members through the stationary plate, the fastener being inaccessible from the exterior of the supporting member and from the exterior of the first and second members, the cross portion of the first member overlaying the fastener. In situations where access may be gained to the opposite side of the plate to which the first and second members are mounted, the assembly further comprises a supporting member disposed on the opposite side of the plate, at least one fastener of the second fastening means extending through the stationary plate into operative engagement with supporting member and the supporting member preventing access to the fastener from said opposite side of the stationary plate.

The object to be mounted by the brackets preferably comprises a metal box having opposite side walls thereof received by the legs of the first member. Preferably the metal boxs is a container as shown in Ser. No. 760,955 including a plurality of walls, at least one wall having an access opening formed therein and allowing access to controls of an appliance within the box, and one of the box walls being movable to allow removal of the appliance from within the box. Means are provided for latching the movable box wall to the rest of the box, the latching means comprising a first plurality of spaced tubular members having aligned bores and extending from the movable wall, a second plurality of spaced tubular members having aligned bores and extending from the wall of the box distinct from the movable wall, the second plurality of tubular members being spaced apart in a manner to receive the first plurality of spaced tubular members therebetween with bores of the first and second plurality of members aligned, removable harden metal latching bolt having cross sectional dimensions generally corresponding in shape to the shape of the bores in the first and second plurality of spaced tubular members for receipt thereby to hold the first and second plurality of bores in alignment, and a locking means for holding latching bolts in place received by the first and second plurality of tubular members to prevent relative movement between the tubular members, said locking means including a key release means. The tubular members are preferably mounted within the volume defined by the box so that no access may be gained thereto or to the removable harden metal latching bolt from the exterior. A number of openings may be provided in the box for receipt of the first fastening means, to allow adjustment of the angular position of the box with respect to the stationary plate.

The term "stationary plate" as used in the specification and claims is not to be interpreted to be limited to planar members, but rather is to be interpreted to encompass all structural members having significant dimensions in perpendicular first and second directions, no matter what the contour of the surface thereof. The term "generally U-shaped member" as used in the specification and claims is to be interpreted to cover all members having a pair of legs and a cross portion despite the exact configurations of the legs and cross portions (i.e., curved, straight, etc.).

It is the primary object of the present invention to provide a bracket mounting assembly for mounting an object to a stationary plate that provides ready mounting yet makes removal of the object by an unauthorized person very difficult. This and other objects of the invention will become clear from an inspection of the detailed description of the invention, and from the appended claims.

BRIEF DESCRIPTION OF THE DRAWINGS

FIG. 1 is a perspective view of an exemplary container that may be utilized in the assembly according to the present invention;

FIG. 2 is a schematic view partly in section showing tubular members of the container of FIG. 1 for receipt of a latching bolt;

FIG. 3 is a detailed view, partly in section and partly in elevation, showing exemplary locking, latching, ejecting means for the container of FIG. 1;

FIG. 4 is a detailed cross sectional view of exemplary non-removable attaching means for attachment of the container of FIG. 1;

DETAILED DESCRIPTION OF THE INVENTION

Figure 5:
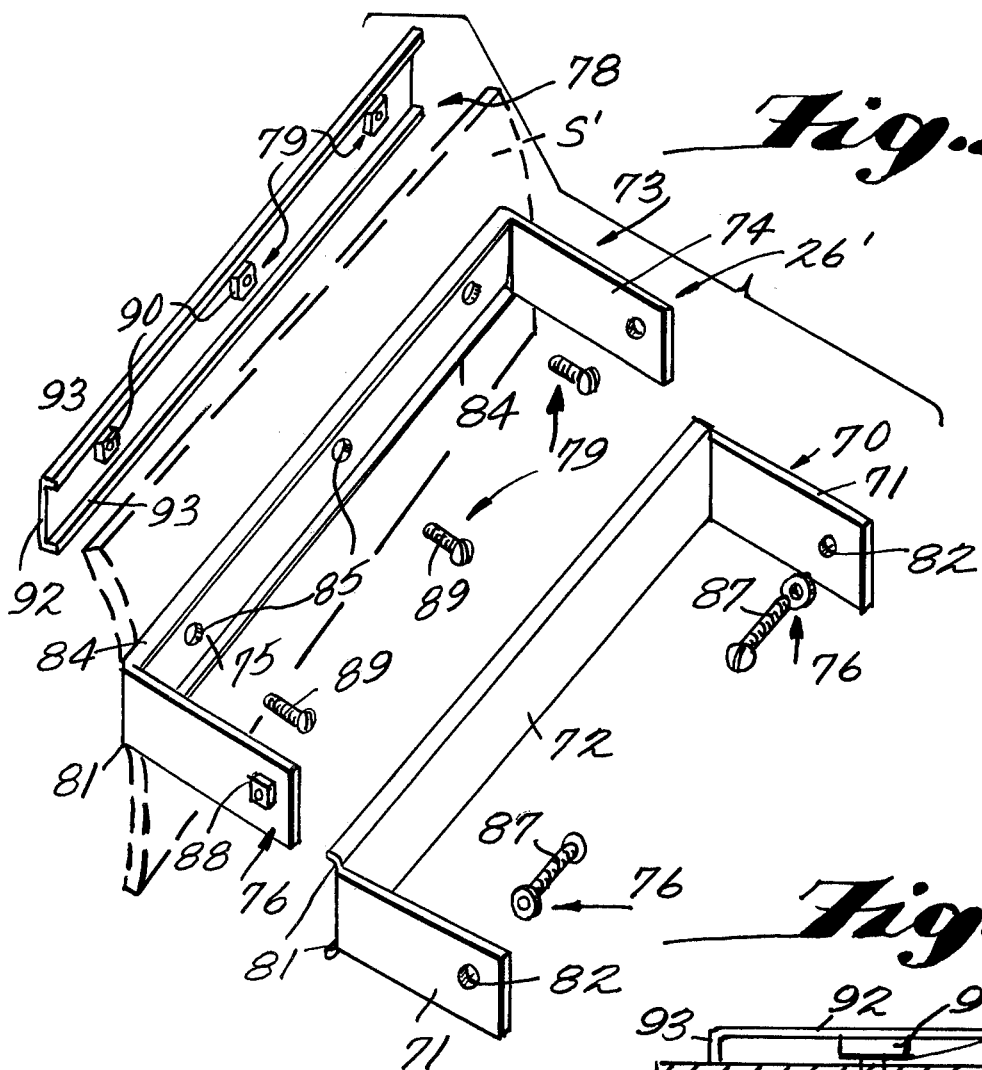
FIG. 5 is an exploded view of an exemplary bracket according to the present invention for mounting an object to a stationary plate.

A container for an appliance or the like that can be utilized with the bracket mounting assembly according to the present invention, to be mounted to a stationary plate, comprises a metal box 10 for receipt of an appliance A therewithin. A plurality of walls 11 of the box 10 are provided, at least one wall 11 having an access opening 12 formed therein allowing access to the control C of an appliance A within the box 10 (see FIGS. 1, 6 and 9). One of the box walls (14) is movable to allow removal of the appliance A from within the box 10.

Means 16 are provided for latching the movable box wall 14 to the rest of the box 10 to prevent unauthorized movement of said movable wall 14. The latching means comprises a first plurality of spaced tubular members 18 having aligned bores 19, and extending from the movable wall 14, a second plurality of tubular members 20 having aligned bores 21 and extending from a wall 11 of the box 10 distinct from said movable wall 14, the second plurality of tubular members 20 being spaced apart in a manner to receive the first plurality of space tubular members 18 therebetween with bores 19, 21 aligned (see FIGS. 2 and 3); a removable hardened metal latching bolt 22 having cross-sectional dimensions generally corresponding in shape to the shape of the bores 19, 21 for maintaining the bores 19, 21 in alignment; and locking means 24 for holding the latching bolt 22 in place received by the first and second plurality of tubular members 18, 20 to prevent relative movement between the tubular members 18, 20, the locking means 24 including a key release means 25. Exteriorly non-removable means 26, 26', or 26" (see FIGS. 1, 5 and 8 respectively) are provided for attaching the box 10 to a stationary support S, S' or S", so that the box 10 may not be removed from the support S, S', S" except by a destruction of the box 10 or the support S', S", or the means 26, 26', 26".

The box 10 and the walls 11, 14 thereof may be made of any suitable metal, and the size of the box 10 relative to the size of the appliance A may be dimensioned so that the appliance either fits tightly within the box 10 (so that upon pounding destruction of the box 10 the appliance A is also destroyed) or so that the appliance A fits loosely within the box 10 (so that upon pounding and denting of the box walls 11 the appliance will not necessarily be destroyed). Preferably, the movable wall 14 is attached to one of the stationary walls 11 by a hinge 28, the hinge being provided of sturdy metal construction and preferably being disposed within the interior of the box 10, although it may be disposed on the exterior of the box assuming that the pin for the hinge and the tubular members for receipt of the hinge pin are of a construction as sturdy as that of the tubular members 18, 20 and the latching bolt 22. Of course other means of attachment of the movable wall to stationary wall members in addition to the latching means 16 may be provided (such as another latching means 16).

The latching bolt 22 preferably is of hardened steel, and it is so designed in length that it is completely received by the tubular members 18, 20, when inserted into locked latching position, no portions of the bolt 22 extending exteriorly of the members 18, 20. In this way, access to the bolt 22 may not readily be gained, and the bolt will be completely protected by the members 18, 20. Also, it is desired—when the members 18, 20 are exterior of the box 10—that the members 18, 20 be in close abutting relationship when the movable wall 14 is closed (i.e., see FIG. 3), again to prevent any access from the exterior to the bolt 22. However, it is preferred that the members 18, 20 be disposed within the volume defined by the box 10 (see FIGS. 6 and 9).

The locking means 24 for holding the latching bolt 22 in place, preferably comprises a locking bolt 30 (which may include one, two, or more shafts) disposed within a bolt chamber 31, and movable (each shaft movable) into interfering relationship with the latching bolt 22 by the bias of spring biasing means 36. An opening 32 may be provided within the bolt 22 for receipt of the locking bolt 30, and a locking bolt receiving cavity 34 may be provided for positive receipt of the locking bolt 30 after it passes through the opening 32. The chamber 31 and the cavity 34 are mounted on different walls of the box 10, one being mounted on the movable wall 14 and the other being mounted on a stationary wall 11 cooperating with the movable wall 14. Although either structure may be mounted on either wall, it is preferred that the chamber 31 be mounted on the stationary wall 11, and the cavity 34 on the movable wall 14.

It is desirable to provide structure for automatically locking the latching bolt 22 in place when it sufficiently penetrates the bores 19 and 21 and is received by the members 18, 20. Such structure may comprise automatically releasable holding means 38 which hold the locking bolt 30 against its spring bias out of interfering relationship with the latching bolt 22, until the latching bolt 22 has completely penetrated the bores 19, 21. Such means 38 preferably comprise a reciprocal cam rod 40, reciprocal within a guide 39 (which guide 39 may be mounted on the interior of the box 10), a cam face 41 formed on the penetrating end of the bolt 22, a lever 42 pivotal by the rod 40 to move out of holding relationship with the locking bolt 30, and a spiral spring 43 or the like for biasing the lever 42 so that it holds the locking bolt 30 against the bias of spring 36 out of interfering relationship with the bolt 22. The whole structure 38 may be mounted to the inside wall 11 having the tubular members 20 associated therewith, or it may be mounted to the exterior of that wall or in other ways to effect the desired end results. FIG. 3 is just a schematic showing of such means, and the shapes of various components thereof might have to be modified depending on the particular environment and the particular dimension of the various components.

The key release means 25 may take a wide variety of forms, however it is preferred that a circular barrel lock cylinder 44 be provided for receipt of a circular barrel key, a rotational portion of the lock cylinder 44 being attached to eccentric cam 46 or the like. Upon insertion of the key into cylinder 44, the cam 46 may be rotated from the position shown in FIG. 3 (wherein it holds the locking bolt 30 out of interfering relationship with the latching bolt 22 against the bias of spring 36) into the cam receiving housing portion 48 of chamber 31 (so that the locking bolt 30 may move under the bias of spring 36 into interfering engagement with the latching bolt 22 upon release of holding means 38).

Since it will normally be desirable to dimension the latching bolt 22 and the tubular members 18, 20, so that the bolt 22 is completely received thereby in locked latching position and/or the members 18, 20 are within the box 10, some mechanism is desirably provided for ejecting the bolt 22 from receipt by the members 18, 20, when it is desired to remove the bolt 22 and move the wall 14. Such latching bolt ejector means 50 may comprise an ejector bolt 52 mounted for reciprocation within a tubular member 20 (extendable into the adjacent tubular member 18) having a head portion 53 thereof, and spring biasing means 54 for biasing the ejector bolt 52 to eject the bolt 22. Preferably, the bolt 52 is so dimensioned so that it can be completely received within the end tubular member 20 upon compression of the spring 54. Releasable ejectable holding means 56 are provided for releasing the bolt 52 to move under the bias of spring 54 and eject the bolt 22. Such means 56 preferably comprise a reciprocal cam rod 58 movable in a housing 59, a spring 60 for biasing the rod 58 into engagement with a latching portion (i.e., head 53) of the bolt 52, and an eccentric cam 62 or the like for holding the rod 58 out of interfering relationship with the bolt 52 (as in FIG. 3). The cam 62 is manually movable as by a knob 63, and if desired, a key-release means can be provided for operation of the cam 62 (such as a combination lock, or a barrel lock cylinder like the cylinder 44, etc.).

The box 10 is attached to the support S so that the box 10 may not be removed from the support S except by destruction of the box or the support. Such attaching means could include conventional attaching members such as rivets, bolts, or screws that were passed through the inside of the box to and into the support so that no access to such fastening means could be gained from the exterior of the box, or alternatively non-removable means exterior of the box 10 could be provided. The means 26 for attaching the box 10 to the support S so that the box 10 may not be removed from the support S from a location exterior of the box 10 except by destruction of the box or the support, preferably includes a plurality of flanges 64 each having a plurality of depending threaded portions 66 associated therewith for cooperation with a corresponding plurality of threaded openings 68 provided in the support S. A prison screw 70 is disposed in each threaded portions 66 and corresponding opening 68. Prison screws conventionally comprise a threaded shank member that is attached to the head by a frangible coupling, so that upon threading of the shank into the desired position, the head may be removed by applying a force thereto, so that no tool engaging portion upstands from the screw shank so that the removal of the screw shank from threaded engagement with its cooperating openings is difficult—if not impossible—without complete destruction of the surrounding portions.

Figure 7:
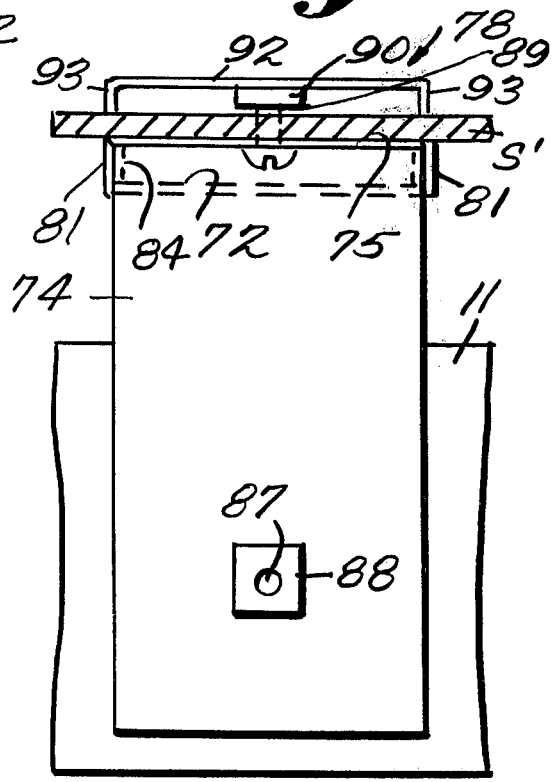
FIG. 7 is a side view, showing the plate in cross section, of the bracket of FIG. 5 actually mounting an object to the plate.
Figure 6:
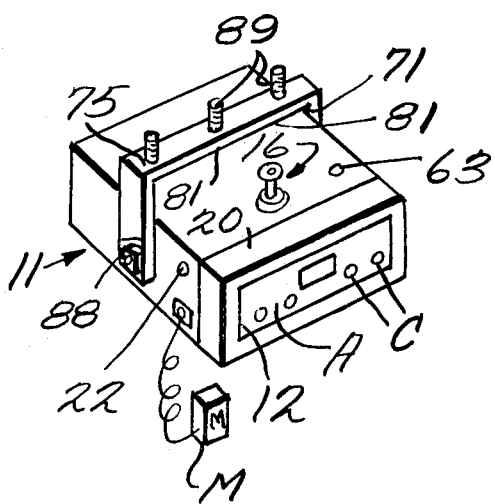
FIG. 6 is a perspective schematic view of the bracket of FIG. 5 for mounting a container similar to that in FIG. 1.

The bracket means 26' shown in FIGS. 5 through 7 is especially adapted for mounting a box 10, or similar object, to the dash or like supporting structure (S') of a motor vehicle interior. The bracket assembly 26' includes a first generally U-shaped member 70 having the legs 71 thereof spaced a distance sufficient to receive the box 10, or like object, therebetween, and a second generally U-shaped member 73 having the legs 74 thereof spaced an effective distance sufficient to receive the legs 71 of the first member 70 therebetween. The first member 70 has a cross portion 72, while the second member 73 has a cross portion 75. The first fastening means 76 are provided for fastening the object (box 10) to both said first and second members legs 71, 74. The first fastening means 76 comprises at least one removable fastener 87 extending from the interior of the object (box 10) through each leg 71 of the first member 70 into operative association with each leg 74 of the second member 73. Second fastening means 79 are provided for fastening the second member 73 to the stationary plate S', the second fastening means 79 comprising at least one fastener 89 extending from between the cross portions 72, 75 of the first and second members 70, 73 through the stationary plate S', said at least one fastener 89 being inaccessible from the exterior of the first and second member 70, 73 when they are attached together (FIGs. 6 and 7), the cross portion 72 of the first member 70 overlaying the fastener 89.

Each fastener 87 preferably comprises a threaded screw, the head of the threaded screw abutting the inside of the object (box 10) while the shank thereof extends through an opening 82 and a leg 71 of the first member 70, passes through a corresponding opening 86 formed in a leg 74 of the second member 73, and into threaded engagement with a closed end nut 88 or the like fastened to the exterior of the leg 74. The cross portion 72 of the first member 70 preferably has flange portions 81 formed along the length of the sides thereof, which overlap corresponding flange portions 84 formed on the cross portion 75 of the second member 73, said flange portions 81, 84 further insuring that no access can be gained to the fastener(s) 89.

The second fastening means 79 fasteners 89 preferably also includes threaded screws, which pass through opening 85 formed in the cross section 75, and through the stationary plate S'. Since the opposite side of the stationary plate S' from the member 73 normally is accessible to an individual inside a motor vehicle, it is desirable to further provide a supporting member 78 disposed on the opposite side of the stationary plate S' (dash). The second fastening means 79 further includes threaded nuts 90 or the like, corresponding to each openings 85 in the cross portion 75, for receipt of the threaded shank of fastener 89. The nut members 90 are welded or otherwise integrally attached to the body portion 92 of the supporting member 78. Flange portions 93 are formed along either side of the body portion 92 of supporting member 78 to ensure that access to the fasteners 89 cannot be gained from the exterior of the supporting member 78 (see FIG. 7).

In FIG. 6 a box 10, generally as shown in FIG. 1 and having locking means 16 associated therewith similar to that in FIG. 1, is provided as the object mounted between the legs 71 of the first U-shaped member 70. The box 10 in FIG. 6 has interior tubular members 18, 20, with the hardened metal latching bolt 22 being inserted in operative relationship therewith through an opening in the near wall 11 of the box 10 in FIG. 6.

An exemplary method of use of the bracket assembly 26' in FIGS. 5 through 7 with a box 10 is as follows: the key release means 25 are actuated, and the knob 63 is moved so that the spring 54 forces the latching bolt 22 exterior of the wall 11 of the box 10 so that it can be grasped and removed from cooperating relationship with the tubular members 18, 20 formed inside the box 10. The movable wall 14 is then pivoted down about pivot 28, and the appliance A removed from the box 10. The supporting member 78 is disposed on the back side of the dash S', and the fasteners 89 are passed through the openings 85 in the cross portion 75 of the second member 73 and threaded into engagement with nuts 90 so that the legs 74 of the second member 73 extend downwardly from the dash S'. The first member 70 is then slipped into engagement with the second member 73 so that the legs 74 receive the leg 70 (FIGS. 6 and 7) and the cross portions 71 and flanges 81 prevent access to the fasteners 89. The walls of the box 10 are then moved so that are received by the legs 71, and the fasteners 87 are passed from inside the volume defined by the box 10 through openings (not shown) formed in the walls 11 of the box 10, through the openings 82, 86 and into threaded engagement with the members 88. The appliance A is then inserted into the box 10, the movable front wall 14 is closed, the hardened latching bolt 22 is moved into locking position, and the key for the key release means 25 is removed. In this final position, there is no access to the locking mechanism for the box, nor for any of the means for attaching the box to the bracket or the bracket to the support, therefor removal of the appliance from the support can be gained only by destruction of the support, destruction of the box 10 (or the appliance itself), or by destruction of both of the legs of both cross members, or two different parts of both cross portions of the U-shaped members 70, 73.

Preferably, the U-shaped member 70 is made of 16 gauge sheet metal, or heavier metal, and the second member 73 is made of 12 gauge sheet metal or heavier metal. The bracket mounting assembly 26' is especially useful in trucks which have metal dashes or metal reinforcement plates behind the dashes; ordinarily such a mount would not be useful in conventional cars, however, since the cars have plastic dashes with thin metal supporting bars (if any), and the dashes or supporting bars could easily be ripped out.

Figure 8:
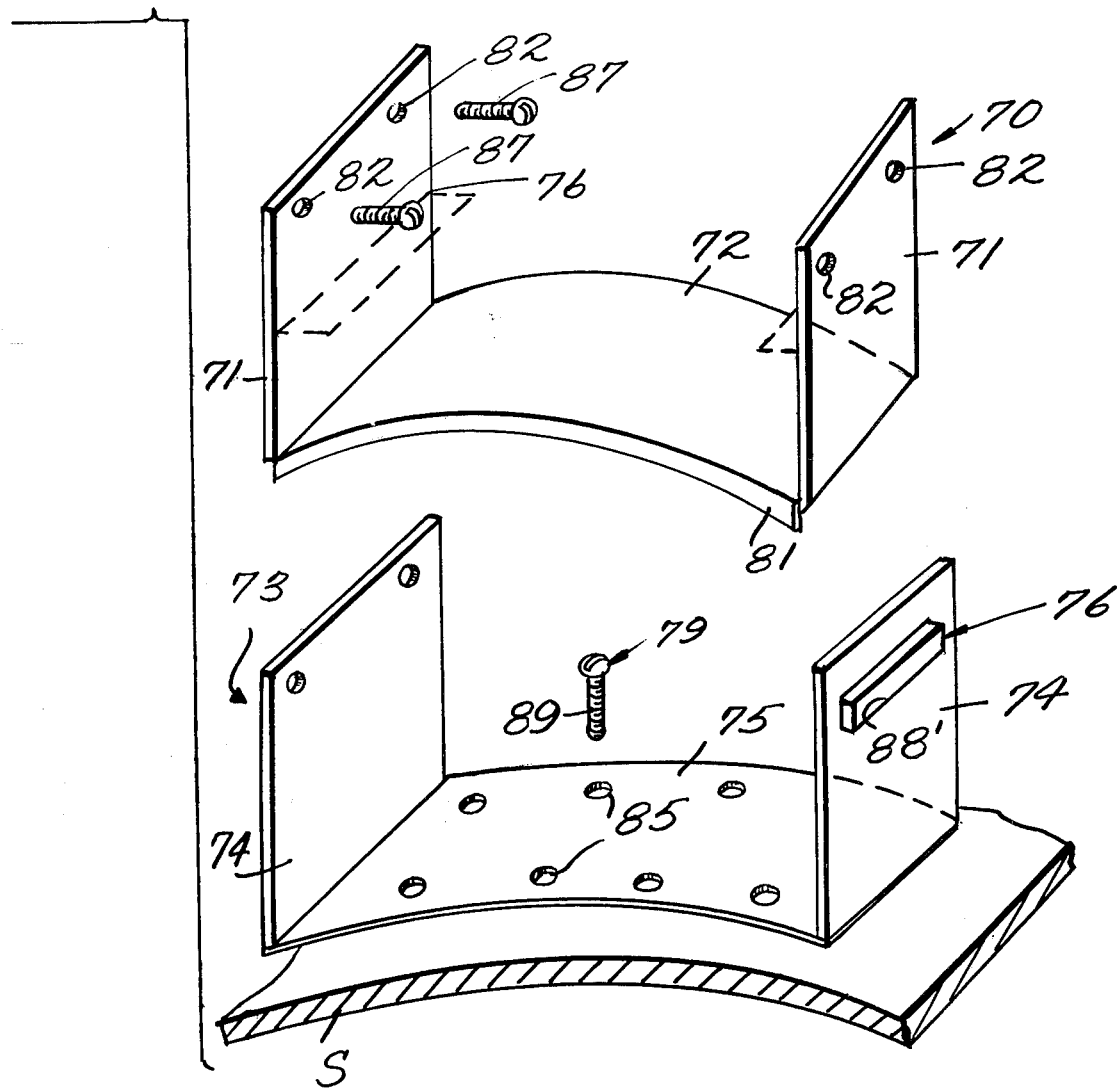
FIG. 8 is an exploded view of another bracket according to the present invention especially adapted for mounting an object to a transmission hump.
Figure 9:
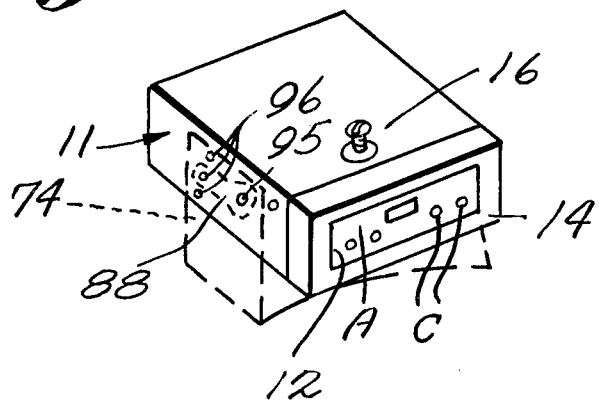
FIG. 9 is a perspective view of a container such as shown in FIG. 6, with the bracket of FIG. 8 shown in dotted line in mounting relationship with the container.

The bracket mounting assembly 26' shown in FIGS. 8 and 9 is especially useful for mounting an appliance like object on the transmission hump or like supporting plate S" of a motor vehicle. Like reference numerals in FIGS. 8 and 9 correspond to those in FIGS. 5 through 7. It is noted in the FIGS. 8 and 9 embodiments that two openings 82 are provided in each leg 71 of the first member 70, and likewise openings 86 are formed in the legs 74 of second member 73. Two sets of openings 95, 96 (see FIG. 9) are provided in the object (box 10) received by the bracket assembly 26", the hole 95 cooperating with one hole 82 in a leg 71, and one of the holes 96 cooperating with the other hole 82 and a leg 71. As shown as FIG. 9, three holes 96 may be provided and depending upon which hole 96 a fastener 87 is passed through, the box 10 may have one of three different angular positions with respect to the supporting plate S'". Alternatively, or in addition, a plurality of holes 82, 86 could be formed at each position in the legs 71, 74 to provide this adjustment if desirable, however it is normally easier to provide the holes in the box 10 side walls 11.

The threaded means 88' in the FIGS. 8 and 9 embodiment may comprise a bar rather than separate nuts at each opening 86, if desired. Merely nuts 90' may be provided for receipt of the threaded fasteners 89 in the FIGS. 8 and 9 embodiment since normally an individual will not have access to the opposite side of the transmission hump plate S" as the bracket assembly 26'. If the support S" is substantial enough to be threaded itself, no nuts 90' are necessary. Additionally, shelf members 97 (shown in dotted line in FIG. 8) may be provided associated with the first member 70 if desired for supporting the bottom of the box 10, however if such shelf members 97 are provided the angular positioning of the box 10 is restricted to only one position.

The use of the bracket assembly 26' is substantially the same as the use of the bracket 26', except of course no supporting member 78 need necessarily be provided.

It will be seen that according the present invention a bracket mounting assembly is provided that prevents the unauthorized removal of an object supported by the bracket mounting assembly from a position which is located with respect to a stationary plate. While the invention has been herein shown and described what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all the equivalent structures and devices.

What is claimed is:

1. A bracket mounting assembly for mounting an object to a stationary plate, said assembly comprising
    (a) a first discrete generally U-shaped member having the legs thereof spaced a distance sufficient to receive the object therebetween,
    (b) a second discrete generally U-shaped member having the legs thereof spaced an effective distance sufficient to receive the legs of the first member therebetween,
    (c) first removable fastening means for fastening the object to both said first and second members legs so that said first fastening means is irremovable from the exterior of said object, said fastening means comprising at least one removable fastener extending from the interior of the object through each leg of said first member into an engaging relationship with each leg of said second member, and
    (d) second fastening means for fastening said second member to said stationary plate, said second fastening means comprising at least one fastener extending from a location between the cross-portions of said first and second members through said first U-shaped member and said stationary plate, said fastener being inaccessible from the exterior of said first and second members when the legs of said first and second members are fastened together with said first fastening means, the cross-portion of said first member overlying and covering said second fastening means.

2. An assembly as recited in claim 1 further comprising a supporting member disposed on the opposite side of said stationary plate as said second member, said second fastening means at least one fastener extending through the stationary plate into operative engagement with said supporting member, the supporting member comprising means for preventing access to the fastener from said opposite side of said plate.

3. An assembly as recited in claim 2 wherein said supporting member includes a plate member having flanges extending substantially at right angles with respect thereto along the length of two opposed sides thereof, and wherein said at least one fastener of said second fastening means comprises a screw with the head thereof abutting the cross portion of said second member and extending through said second member and said stationary plate toward said supporting member, said supporting member having a threaded surface manifestation associated therewith for threadably receiving said screw, said flanges of said supporting member blocking access to said surface manifestation for threadably receiving said screw.

4. An assembly as recited in claim 2 wherein said stationary plate comprises a portion of the dash of a motor vehicle.

5. An assembly as recited in claim 4 wherein said second member is made of 12 gauge sheet metal, or a lower gauge.

6. An assembly as recited in claim 1 wherein said cross-portion of said first member has flange portions extending along the length thereof along the sides thereof, said flange portions overlapping said second member cross-portion to prevent access to said at least one fastener between said first and second members.

7. An assembly as recited in claim 1 further comprising a metal box having opposite side walls thereof received by said legs of said first member, said box comprising the object for mounting to the stationary plate.

8. An assembly as recited in claim 7 wherein said first fastening means comprises two screws extending from the interior of said box for each leg of said first fastening means with the head of each screw abutting the inside of said box, and threaded-screw receiving means formed on each leg of said second member for thereby receiving said screws.

9. An assembly as recited in claim 8 wherein said box has a plurality of openings formed therein for receipt of a screw, the particular openings of said plurality of openings receiving said screw determining the angular disposition of said box with respect to said first member.

10. An assembly as recited in claim 7 wherein said metal box receives an appliance therein, and wherein said metal box has a plurality of walls, at least one wall having an access opening formed therein allowing access to controls of an appliance within said box, and one of said box walls being movable to allow removal of an appliance within the box from said box, and means for latching said movable box wall to the rest of said box to prevent unauthorized movement of said movable box walls.

11. An assembly as recited in claim 10 wherein said means for latching said movable box walls to the rest of said box comprises (i) a first plurality of spaced tubular members having aligned bores and extending from said movable wall, (ii) a second plurality of spaced tubular members having aligned bores and extending from a wall of said box distinct from said movable wall, said second plurality of tubular members being spaced apart in a manner to receive said first plurality of spaced tubular members therebetween with bores of said first and second plurality of members aligned, (iii) a removable hardened metal latching bolt having cross-sectional dimensions generally corresponding in shape to the shape of said bores in said first and second plurality of spaced tubular members for receipt thereby to hold said first and second plurality of bores in alignment, and (iv) a latching means for holding said latching bolt in place received by said first and second plurality of tubular members to prevent relative movement between said tubular members, said latching means including a key-release means.

12. An assembly as recited in claim 11 wherein said first and second pluralities of spaced tubular members are disposed within the volume defined by said box, said latching bolt extending through an opening formed in one wall of said box into the interior of the volume defined by said box into operative association with said pluralities of said tubular members.

13. An assembly as recited in claim 1 wherein said stationary plate comprises the transmission hump of an automobile, and wherein said cross portions of said first and second members have curvatures corresponding to the curvature of said stationary plate so that said first and second members may be mounted on an automobile transmission hump.

14. An assembly as recited in claim 1 wherein said first member is made of 16 gauge sheet metal, or a lower gauge.

* * * * *